F. McCLINTOCK.
VALVE FOR INTERNAL COMBUSTION ENGINES.
APPLICATION FILED NOV. 12, 1913., RENEWED MAR. 2, 1917.
1,242,460.
Patented Oct. 9, 1917.
2 SHEETS—SHEET 1.
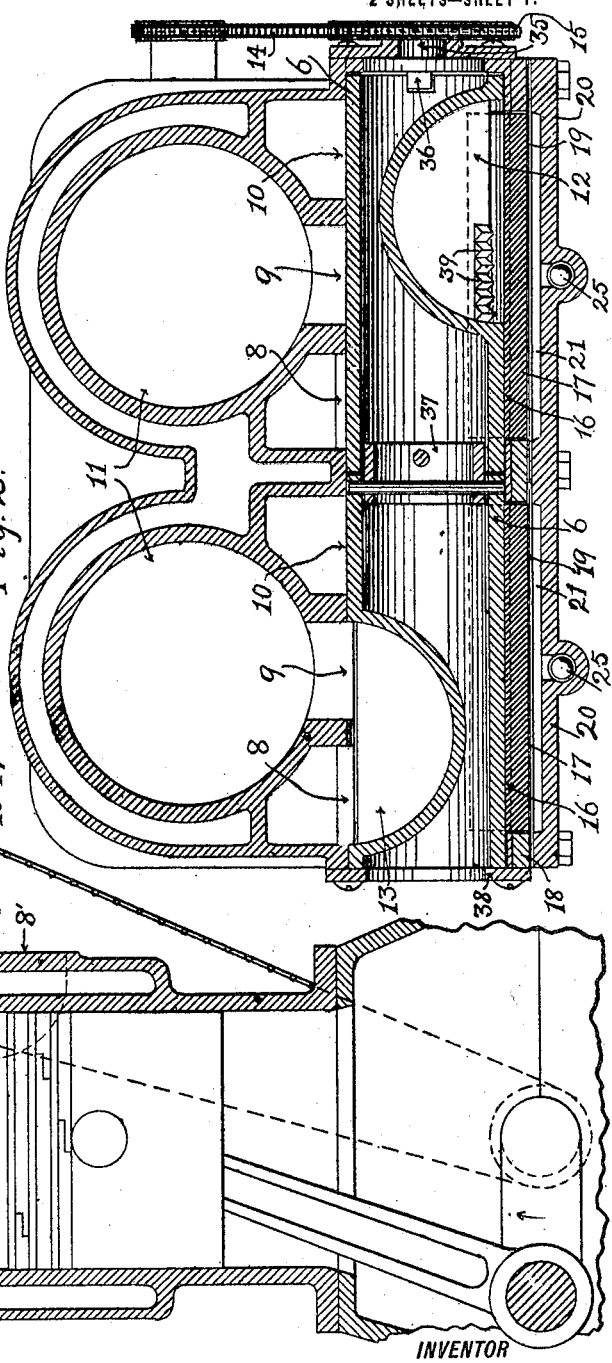
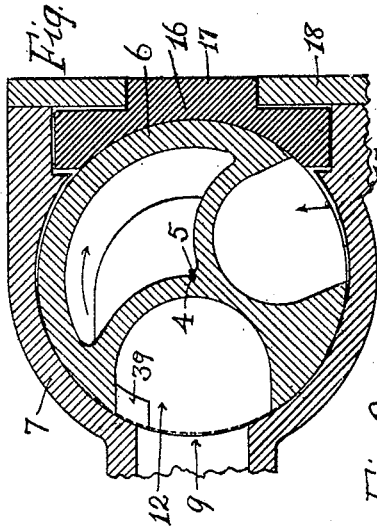
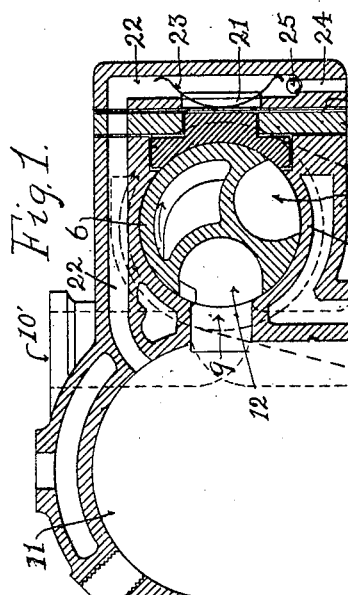
WITNESSES:
J. K. McClintock
Merle M. McClintock
INVENTOR
Frank McClintock.

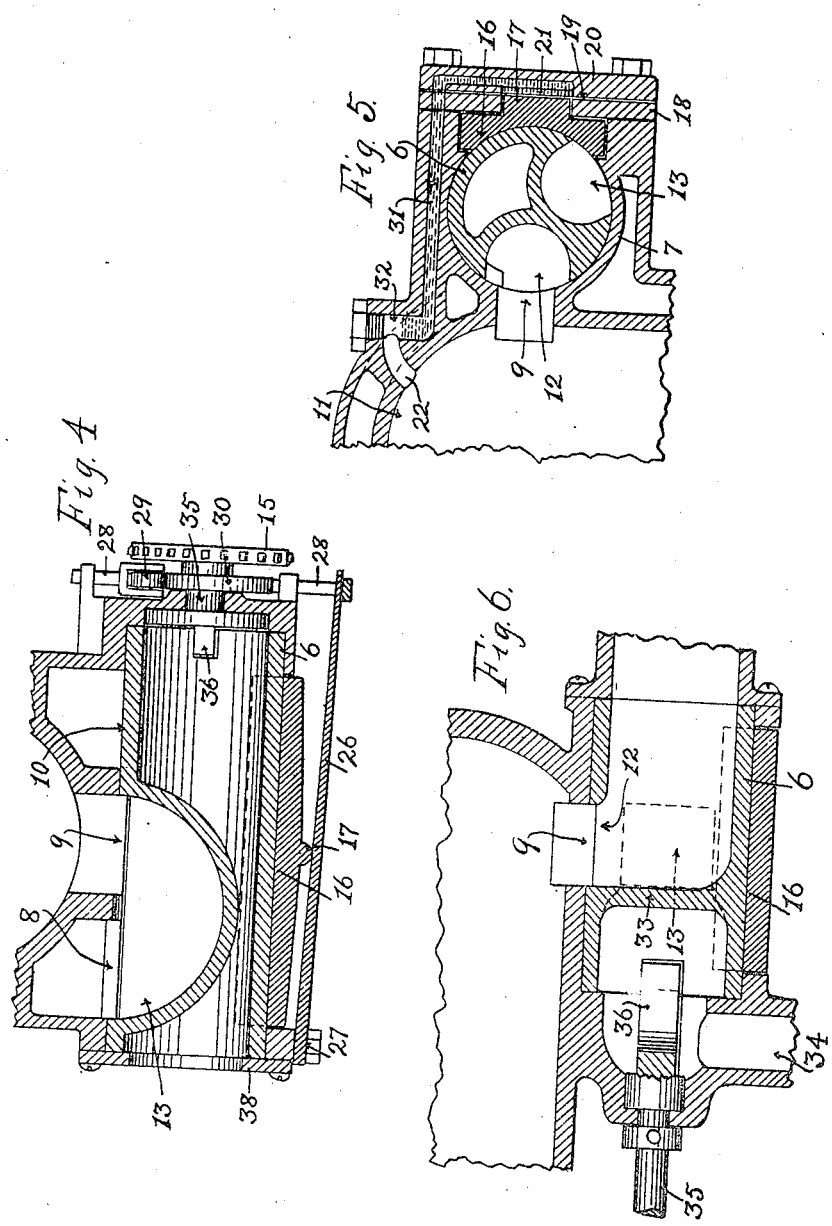

UNITED STATES PATENT OFFICE.

FRANK McCLINTOCK, OF GRAND JUNCTION, COLORADO.

VALVE FOR INTERNAL-COMBUSTION ENGINES.

1,242,460. Specification of Letters Patent. Patented Oct. 9, 1917.

Application filed November 12, 1913, Serial No. 800,474. Renewed March 2, 1917. Serial No. 152,151.

*To all whom it may concern:*

Be it known that I, FRANK McCLINTOCK, a citizen of the United States, residing at Grand Junction, in the county of Mesa and State of Colorado, have invented certain new and useful Improvements in Valves for Internal-Combustion Engines, of which the following is a specification.

My invention relates especially to rotary or reciprocating valves for internal combustion engines which are located external to the combustion chamber of the cylinder, and the objects of my invention are, first, to provide a valve fitted sufficiently loose within its casing to allow for expansion by heat without danger of sticking or seizing, and provided with recessed connecting ports adapted to connect the combustion chamber with the intake and exhaust pipes in proper sequence, said connecting ports being sealed gas tight when in operative communication with the combustion chamber; and, second, to provide means for holding the valve gas tight in its seat against the outward pressure of the cylinder gases during the compression and power strokes of the engine piston, such counter pressure being automatically varied proportional to that within the cylinder; and, third, to provide an antifriction bearing block for distributing the counter pressure over substantially the entire surface of the valve in order to reduce the working pressure and friction and make the wear uniform over the finished surface of the valve.

I attain these objects by means of the mechanism shown in the accompanying drawings, in which:

Figure 1 is a vertical cross section view showing the preferred construction of a rotary valve embodying my invention; Fig. 2 is a longitudinal section view of the valve, these two figures showing the valve as designed especially for a two-cylinder internal combustion engine of the four-cycle type; Fig. 3 is a cross section view to show more clearly the eccentricity of the valve within its casing; Figs. 4 and 5 are sectional views showing alternative forms of construction of the mechanism for holding the valve against its seat; Fig. 6 shows an alternative arrangement of the ports of the rotary valve.

Similar reference characters refer to similar parts in each of the several views shown.

The rotary valve, shown in Figs. 1 and 2, as the preferred form of construction embodying my invention, consists of an annular cylinder 6 having a diameter somewhat less than the bore of its cylindrical casing 7. The outer surface of the valve is finished truly cylindrical, and is then ground into a longitudinal seat at that side of the casing where the several port openings are located, the grinding being continued until such seat extends laterally a sufficient distance each side of the port openings to insure a gas tight fit of the valve and its recessed connecting ports during the entire time they are in operative communication with the combustion chamber. This construction is more clearly shown in Fig. 3, in which the original internal bore of the casing 7 is shown by the broken lines, while the full lines show the valve after being ground into its seat. The axis 4 of the valve, when seated, is thus slightly eccentric to the axis 5 of the casing. The grinding of the valve seat to the required width during construction is very essential, since the pressure of the valve against its seat is so nearly balanced when in operation that the wearing of the valve to a proper seat in the casing during operative rotation could not occur. This construction not only provides ample clearance to allow for the expansion of the valve by heat, but also allows oil to be applied and distributed freely to its surface for lubrication, while the gas tight sealing of the recessed connecing ports prevents leakage of exhaust gases into the valve casing and the consequent heating of the valve and accumulation of carbon in the casing.

Three port openings, 8, 9 and 10, for each cylinder, are located longitudinally along the valve seat and parallel with the axis of the casing as shown in Fig. 2. The central port 9, extends directly into the combustion chamber 11 of the cylinder and may be termed the cylinder port; the left-hand port 8, provides the inlet for the combustible charge, while the right hand port 10, is the outlet for the exhaust gases.

Each valve is provided with two recessed ports, 12 and 13, which are adapted to connect the cylinder port 9, alternately at the proper time to the inlet port 8, and the exhaust port 10. The angular width of the several port openings in the valve casing and the width and angular distance between the two recessed valve ports 12 and 13, should be such as will give the desired timing of the opening and closing of the inlet and exhaust ports. In Fig. 1 the exhaust port is shown fully open, the engine piston having completed substantially one-half of the exhaust stroke. In Fig. 2, the inlet port of the left-hand valve, is shown fully open, the corresponding piston having completed nearly one-half of its induction stroke, and the right-hand valve is closed, that piston having completed substantially one-half of its compression stroke. Each section of the valve here shown, is provided with only a single recessed inlet port and a single recessed exhaust port and is therefore designed to make one revolution for each four strokes or two revolutions of the engine crank shaft. The valve may be rotated at the required rate by any suitable gearing, such as the link belt chain 14, shown, which connects the sprocket wheel 15, to a similar sprocket wheel on the engine crank shaft, having one-half the number of teeth. It will be evident that the relative speed of rotation of the valve may be further reduced by increasing the number of the recessed ports therein. For instance, a valve having two recessed inlet ports located diametrically opposite each other and two recessed exhaust ports also located diametrically opposite each other would be required to make only one revolution for four revolutions of the engine crank shaft.

In a valve of this type, where the outward pressure of the confined gases tends to force the valve away from its seat, it is evident that some form of counter pressure must be provided. In order that the pressure of the valve against its seat may be maintained substantially uniform throughout the cycle and be just enough to insure a gas tight fit, this counter pressure must be sufficient in amount to overbalance the direct outward pressure of the cylinder gases against such area of the valve as is exposed thereto, and should vary directly proportional to the pressure within the cylinder.

The varying pressure of the cylinder gases has heretofore been utilized to apply this counter pressure to the valve by means of a piston or pressure block having an area somewhat greater than the area of the cylinder port; one side of such piston or pressure block being exposed to the pressure of the cylinder gases and the other being in contact with the valve. This construction, however, puts an excessively high maximum pressure on a limited area of the highly heated valve causing unequal wear and excessive friction on that part of the valve and making efficient and uniform lubrication difficult to maintain.

I overcome these difficulties by providing a bearing block, interposed between the pressure block or piston and the valve, whereby the required counter-pressure may be distributed uniformly over substantially the entire effective bearing surface of the valve, thus reducing the pressure per square inch so low that the wear and friction will be reduced to a minimum, and uniform and perfect lubrication may be easily maintained.

The preferred mechanism for carrying out this essential feature of my invention comprises the bearing block 16 which is located in a recess in the valve casing diametrically opposite from the port openings 8, 9 and 10. The length of this bearing block should nearly or quite equal that of the valve and of such maximum width as is practical. Since substantially the entire pressure load of the valve is carried by the bearing block it should preferably be made of some suitable antifriction metal and its inner surface should be closely fitted to the surface of the valve.

A pressure block 17, having an area equal to or slightly greater than that of the cylinder port 9 is secured to the outer face of the bearing block 16, or may be made an integral part therewith. The excess in area of the pressure block 17 over that of the port 9 should only be such that the counter pressure thereon will always hold the valve gas tight in its seat. A frame plate 18, of substantially the same thickness as the pressure block 17, incloses said pressure block, but is spaced from direct contact with the bearing block 16. A flexible gas tight diaphragm 19 is placed over the pressure block and frame plate and is secured thereto by means of the recessed plate 20, which is securely bolted to the valve casing as shown. The gas tight pressure chamber 21, which is thus formed, is at all times in direct communication with the combustion chamber of the engine cylinder 11, by means of an opening 22, so that the pressure within said pressure chamber will at all times be substantially the same as in the engine cylinder. This pressure, acting through the flexible diaphragm 19, on the entire area of the pressure block 17, in contact therewith is transmitted to substantially the entire outer effective bearing surface of the valve 6, whereby the pressure per square inch is so reduced that efficient lubrication may be easily maintained and the valve at all times held gas-tight in its seat against the outward pressure of the cylinder gases on the area of the valve exposed through the cylinder port 9. Any desired excess of pressure above the minimum required for holding the valve in its seat may be secured by further increasing the area of the pressure block. The area of the bearing block 16 being many times greater than that of the pressure block 17, its maximum pressure against the valve will be comparatively low per square inch even with the high maximum pressures developed in internal combustion engines.

With a valve constructed as shown it will be evident that the weight of the valve will cause it to drop away from its seat, and it is desirable that the valve be retained in actual contact with its seat, particularly during the induction and exhaust strokes of the engine piston. This may be effected by a spring 23, located within the pressure chamber 21. The pressure of this spring on the pressure block need not be sufficient to prevent lubricating oil from being carried by the valve to its seat during the low pressure part of the cycle.

In order to prevent excessive heat within the pressure chamber 21, an opening 24 may be provided, which has a check valve 25, through which fresh air will be drawn during each induction stroke of the engine piston. The size of the air inlet opening 24, should be limited so as to admit only enough fresh air to scavenge the pressure chamber 21 and opening 22.

In order to allow the required flexibility between the valve driving shaft 35, and the valve 6, as well as between the several sections of valve in multi-cylinder engines, some forms of universal joint, such as that shown in the drawings, should be provided.

An alternative form of construction of the valve is shown in Fig. 4, wherein the required variable counter pressure to hold the valve gas tight in its seat may be secured, by mechanical means only. A steel spring 26, of sufficient tension, has one end permanently secured to the valve casing at 27. This spring engages a central rib on the outer face of the pressure block 16. The free end of the spring 26, is engaged by a horizontally moving slide 28, which has a roller bearing 29. A cam 30, secured to the driving shaft 35, engages the roller 29 and is of the proper contour to move the slide 28 toward the left, at such a rate and the proper distance to cause the spring 26 to exert a pressure on the bearing block 16, which will be substantially proportional to and always sufficiently in excess of the outward pressure of the confined gases within the cylinder on the valve to hold it gas tight in its seat during the compression and power strokes of the engine piston. It will be evident that this form of construction will be best adapted for use on engines where the variations in cylinder pressures are substantially uniform and constant, as is the case either when an engine is working under a constant load, or when the "hit and miss" governor is used for speed and power regulation.

In another form of construction shown in Fig. 5, the pressure of the cylinder gases is transmitted to the bearing block 16, by means of a column of some liquid, such as oil, which fills the pressure chamber 21 and communicating tube 31, and a portion of the pressure cup 32. The surface of the liquid in the pressure cup receives the pressure of the cylinder gases through the central opening 22. The liquid being practically non-compressible, transmits the pressure to the bearing block with substantially no loss of pressure, and the action is practically instantaneous.

Fig. 6 shows a modified design in the arrangement of the connecting ports in the rotary valve, which is adapted for engines of one cylinder. In this valve the inlet and exhaust ports are cut entirely through the valve walls. A cross partition 33 divides the valve and one end admits the gaseous charge through a pipe 34, while the exhaust gases may pass out through the other open end of the valve.

I have shown a continuously rotating cylindrical valve as being for many reasons the preferred form of construction, to carry out the principle of my invention. I do not, however, intend to limit my invention to any specific type of valve, since it is evident that the principle of my invention may be readily adapted for reciprocating valves of either flat or circular section by one skilled in the art.

What I claim as new and desire to secure by Letters Patent, is:

1. The combination in an internal combustion engine of a valve casing provided with port openings in its seat, a valve adapted to open and close the port openings in proper sequence, a pressure chamber having a somewhat greater area than the cylinder port in open communication with the combustion chamber, a flexible gas tight diaphragm and a bearing block having an outer part corresponding in section with and extending into the pressure chamber to a contact with the entire exposed area of the diaphragm and an inner surface many times greater in area than the pressure chamber and closely fitted to substantially the entire outer effective bearing surface of the valve.

2. The combination in an internal combustion engine of a cylindrical valve casing provided with port openings in its seat, a cylindrical valve adapted to open and close the port openings in proper sequence, a pressure chamber having a somewhat greater area than the cylinder port in open communication with the combustion chamber, a flexible gas tight diaphragm, and a bearing block having an outer part corresponding in section with and extending into the pressure chamber to contact with the entire exposed area of the diaphragm and an inner surface many times greater in area than the pressure chamber and closely fitted to substantially the entire effective outer bearing surface of the valve.

3. The combination in an internal combustion engine of a valve casing provided with port openings in its seat, a valve adapted to open and close the port openings in proper sequence, a bearing block closely fitted to substantially the entire effective outer bearing surface of the valve, a spring engaging the outer face of said bearing block and means for applying a variable pressure to said spring which will be sufficient to hold the valve gas tight in its seat at all times.

4. The combination in an internal combustion engine of a valve casing provided with port openings in its seat, a valve adapted to open and close the port openings in proper sequence, a bearing block closely fitted to substantially the entire effective outer bearing surface of the valve, a spring engaging the outer face of said bearing block, a sliding arm engaging the free end of said spring, and a cam secured to the valve driving shaft and of such shape as will compress the spring and thereby apply a variable pressure to the bearing block sufficient to hold the valve gas tight in its seat.

5. The combination in an internal combustion engine, of a valve casing provided with port openings in its seat, a valve fitted within said casing and provided with connecting ports adapted to open and close the port openings in proper sequence and finished to a gas tight fit in its seat of sufficient width to seal the ports from leakage while in operative communication with the cylinder, a bearing block having its inner face closely fitted to substantially the entire effective outer surface of the valve, and means for applying a variable pressure to the bearing block just sufficient to hold the valve gas tight in its seat.

6. The combination in an internal combustion engine of a cylindrical valve casing fitted with port openings in its seat, a cylindrical valve fitted within said casing and provided with connecting ports adapted to open and close the port openings in proper sequence and finished to a gas tight fit in its seat of sufficient width to seal the ports from leakage while in operative communication with the cylinder, a bearing block having its inner face closely fitted to substantially the entire effective outer bearing surface of the valve, and means for applying a variable pressure to the bearing block just sufficient to hold the valve gas tight in its seat.

7. The combination in an internal combustion engine of a cylindrical valve casing provided with a central cylinder port and an inlet and exhaust port axially disposed at opposite ends of the cylinder port, a cylindrical valve within said casing provided with suitable recessed connecting ports adapted to connect the cylinder port alternately with the inlet and exhaust ports in proper sequence, a gas tight seat in the valve casing ground to exact curvature of the valve and of sufficient width to seal the recessed ports against leakage while in operative communication with the cylinder, and means for applying a variable pressure to the valve just sufficient to hold it gas tight in its seat.

8. The combination in an internal combustion engine of a cylindrical valve casing provided with suitable port openings therein, a cylindrical valve within said casing having connecting ports and finished to a gas tight fit on its seat where the port openings are located of sufficient width to seal the connecting ports against leakage while in operative communication with the cylinder, a bearing block having an effective area in contact with the valve substantially equal to that of its finished seat and located opposite thereto, a pressure block having an area somewhat greater than the area of the cylinder port secured to the bearing block and with its outer face in operative communication with the gaseous pressure within the combustion chamber, and means for moving said valve to cause the opening and closing of the ports in proper sequence.

9. The combinaion in an internal combustion engine of a cylindrical valve casing provided with a centrally located cylinder port with an inlet port and an exhaust port axially disposed at opposite ends of the cylinder port, a cylindrical valve within said casing having suitable recessed connecting ports, adapted to connect the inlet and exhaust ports alternately in proper sequence with the central cylinder port, a gas tight seat for the valve ground in the casing to sufficient width to seal the valve ports against leakage while in operative communication with the cylinder, a bearing block closely fitted to the surface of the valve and having an area substantially equal to the effective bearing surface of said valve and means for applying a variable pressure to the bearing block just sufficient to hold the valve gas tight in its seat.

10. The combination in an internal combustion engine of a cylindrical valve casing provided with a centrally located cylinder port with an inlet port and an exhaust port axially disposed at each end of the cylinder port, a cylindrical valve within said casing having suitable recessed connecting ports adapted to connect the inlet and exhaust ports alternately in proper sequence with the central cylinder port, a gas tight seat in the valve casing ground to the exact curvature of the valve and of sufficient width to seal the valve ports against leakage while in operative communication with the cylinder, a pressure chamber in open communication with the combustion chamber and provided with a flexible gas tight diaphragm, and a bearing block having its inner face closely fitted to substantially the entire effective bearing surface of the valve and the minimum area of its outer face sufficient to hold the valve gas tight in its seat being in direct contact with the flexible diaphragm.

11. The combination in an internal combustion engine of a cylindrical valve casing provided with a centrally located cylinder port with an inlet port and an exhaust port axially disposed at each end of the cylinder port, a cylindrical valve within said casing having suitable recessed connecting ports adapted to connect the inlet and exhaust ports alternately in proper sequence with the central cylinder port, a bearing block closely fitted to the surface of the valve with an area substantially equal to the effective bearing surface of said valve, a pressure block with an area somewhat greater than that of the cylinder port connected to the outer face of the bearing block, a frame plate closely fitting the pressure block and spaced from contact with the bearing block, a flexible gas tight diaphragm covering the pressure block, a recessed plate bolted to the outer face of the valve casing forming a pressure chamber substantially equal in area to the pressure block, and an open passage between the pressure chamber and the combustion chamber.

12. The combination in an internal combustion engine of a cylinder valve casing, provided with a centrally located cylinder port with an inlet port and an exhaust port axially disposed at each end of the cylinder port, a cylindrical valve within said casing having suitable recessed connecting ports adapted to connect the inlet and exhaust ports in proper sequence with the central cylinder port, a gas tight seat in the valve casing ground to the exact curvature of the valve and of sufficient width to seal the valve ports against leakage while in operative communication with the cylinder, a bearing block closely fitted to the surface of the valve with an area substantially equal to the effective area of said valve, a pressure block with an area somewhat greater than that of the cylinder port connected to the outer face of the bearing block, a frame plate closely fitting the pressure block and spaced from contact with the bearing block, a flexible gas tight diaphragm covering the pressure block, a recessed plate bolted to the outer face of the valve casing forming a pressure chamber substantially equal in area to the pressure block, and an open passage between the pressure chamber and the combustion chamber.

13. The combination in an internal combustion engine of a cylindrical valve casing parallel to the axis of the engine cylinder, a single port in said valve casing, a cylindrical valve open at each end, one end communicating with the inlet passage and the other end communicating with the exhaust passage, port openings through the valve walls adapted to connect the inlet and exhaust passages in proper sequence with the single cylinder port, and means for rotating the valve at the required rate.

Signed at Denver, Colorado, this 16th day of September, 1913.

FRANK McCLINTOCK.

Witnesses:
ELLA E. MILLER,
WM. GUE.